United States Patent
Yamamoto et al.

(10) Patent No.: US 11,209,648 B2
(45) Date of Patent: Dec. 28, 2021

(54) PROJECTION OPTICAL SYSTEM AND DISPLAY APPARATUS HAVING THE SAME

(71) Applicant: CANON KABUSHIKI KAISHA, Tokyo (JP)

(72) Inventors: Akira Yamamoto, Ageo (JP); Keiichiro Ishihara, Ageo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/934,284

(22) Filed: Jul. 21, 2020

(65) Prior Publication Data
US 2021/0033860 A1 Feb. 4, 2021

(30) Foreign Application Priority Data

Jul. 29, 2019 (JP) .............................. JP2019-138510

(51) Int. Cl.
*G02B 27/00* (2006.01)
*G02B 27/01* (2006.01)

(52) U.S. Cl.
CPC ..... *G02B 27/0101* (2013.01); *G02B 27/0081* (2013.01); *G02B 2027/0116* (2013.01)

(58) Field of Classification Search
CPC . G02B 27/01; G02B 27/0101; G02B 27/0081
See application file for complete search history.

(56) References Cited

U.S. PATENT DOCUMENTS

| 5,995,291 | A | 11/1999 | Togino |
| 6,147,807 | A | 11/2000 | Droessler |
| 6,317,267 | B1 | 11/2001 | Takahashi |
| 9,086,569 | B1* | 7/2015 | Cakmakci ................ G02B 9/02 |
| 2017/0311794 | A1* | 11/2017 | Inoue .................... A61B 3/0083 |

FOREIGN PATENT DOCUMENTS

| JP | H08313829 A | 11/1996 |
| JP | H09258104 A | 10/1997 |
| JP | 2001242412 A | 9/2001 |

OTHER PUBLICATIONS

Copending U.S. Appl. No. 16/934,411, filed Jul. 21, 2020.

* cited by examiner

*Primary Examiner* — Alexander Eisen
*Assistant Examiner* — Cory A Almeida
(74) *Attorney, Agent, or Firm* — Rossi, Kimms & McDowell LLP

(57) ABSTRACT

An optical system guides a light beam from a display element, the optical system comprising a plurality of lenses and an optical element. The optical element includes an entrance surface which the light beam from the plurality of lenses enters, a reflection surface configured to reflect the light beam, and an emission surface from which the light beam is emitted toward an exit pupil. The light beam from the display element enters the optical element via the plurality of lenses, is reflected a plurality of times inside the optical element, and heads for the exit pupil. A predetermined condition is satisfied.

11 Claims, 10 Drawing Sheets

PROJECTION OPTICAL SYSTEM AND DISPLAY APPARATUS HAVING THE SAME

BACKGROUND OF THE INVENTION

Field of the Invention

The present invention relates to an optical system that guides a light beam from a display element.

Description of the Related Art

Conventionally, some display apparatuses are known to project an image displayed on a display element onto an observer's eye via a projection optical system and via a light guiding element. Japanese Patent Laid-Open No. ("JP") 2001-242412 discloses an optical system including a prism configured to guide a light beam from a display element and an optical element having a positive power disposed between the prism and the display element. U.S. Pat. No. 6,147,807 discloses the optical system in which two lenses are disposed between the display element and the prism.

However, in the optical system disclosed in JP 2001-242412, a chromatic aberration is caused by the optical element having the positive power, and thus an optical performance deteriorates. Moreover, in JP 2001-242412, the optical system further includes the optical element configured to correct the chromatic aberration between a pupil and the prism, which increases the number of parts. In the optical system disclosed in U.S. Pat. No. 6,147,807, both the two lenses disposed between the display element and the prism have the positive powers. However, because U.S. Pat. No. 6,147,807 does not correct the chromatic aberration, the observed image deteriorates due to an occurrence of the chromatic aberration.

SUMMARY OF THE INVENTION

The present invention provides a projection optical system and a display apparatus, each of which can correct a chromatic aberration and form a high-quality image while sufficiently ensuring a distance between a display element and an optical element.

An optical system according to one aspect of the present invention guides a light beam from a display element, the optical system comprising a plurality of lenses and an optical element. The optical element includes an entrance surface which the light beam from the plurality of lenses enters, a reflection surface configured to reflect the light beam, and an emission surface from which the light beam is emitted toward an exit pupil. The light beam from the display element enters the optical element via the plurality of lenses, is reflected a plurality of times inside the optical element, and heads for the exit pupil. A predetermined condition is satisfied.

A display apparatus including the above optical system also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

First, the outline will be given of the first embodiment of the present invention. This embodiment relates to a projection optical system configured to project an image displayed on a display element onto an observer's eye and a display apparatus having the same. The display apparatus includes the display element, the projection optical system, and a light guiding element. The projection optical system converts a light beam emitted from the display element into a light beam in an angle of view and makes the light beam enter the light guiding element. The light beam is guided inside the light guiding element and emitted from the light guiding element. Thereafter, the light beam enters the observer's eye to display the image to the observer.

The projection optical system in this embodiment includes the lens unit and a free-formed surface prism in order from the display element side, and forms an exit pupil ahead of them. The projection optical system disposes the exit pupil inside the light guiding element and makes the light beam from the projection optical system enter the light guiding element, whereby the size is reduced of the light guiding element. In the projection optical system, the exit pupil is disposed so that the exit pupil matches an entrance portion of the light guiding element, and thus the light guiding element guides the light while being filled with the light beam. Having such a configuration, the projection optical system in this embodiment can correct the chromatic aberration well.

Here, a description will be given of a chromatic aberration correction in this embodiment. The chromatic aberration occurs on a refraction surface, and it is necessary to take a countermeasure against the occurrence of the chromatic aberration on the refraction surface in order to keep the chromatic aberration small. In this embodiment, the refraction surfaces are an entrance/exit surface (emission surface) of the free-formed surface prism and each lens surface of the lens unit. The entrance/exit surface of the free-formed surface prism can be made substantially planer by configuring the reflection surface to have a main optical power of the free-formed surface prism. Since the power of the refraction surface decreases, it is possible to suppress the occurrence of the chromatic aberration in the free-formed surface prism. For each lens surface of the lens unit, the chromatic aberration can be suppressed by correcting the chromatic aberration in the lens unit. The projection optical system in this embodiment can provide a high-quality image to the observer while suppressing the occurrence of the chromatic aberration, by correcting the chromatic aberration in each of the free-formed surface prism and the lens unit and by combining these two optical element units (free-formed surface prism and lens unit).

Figure 1:
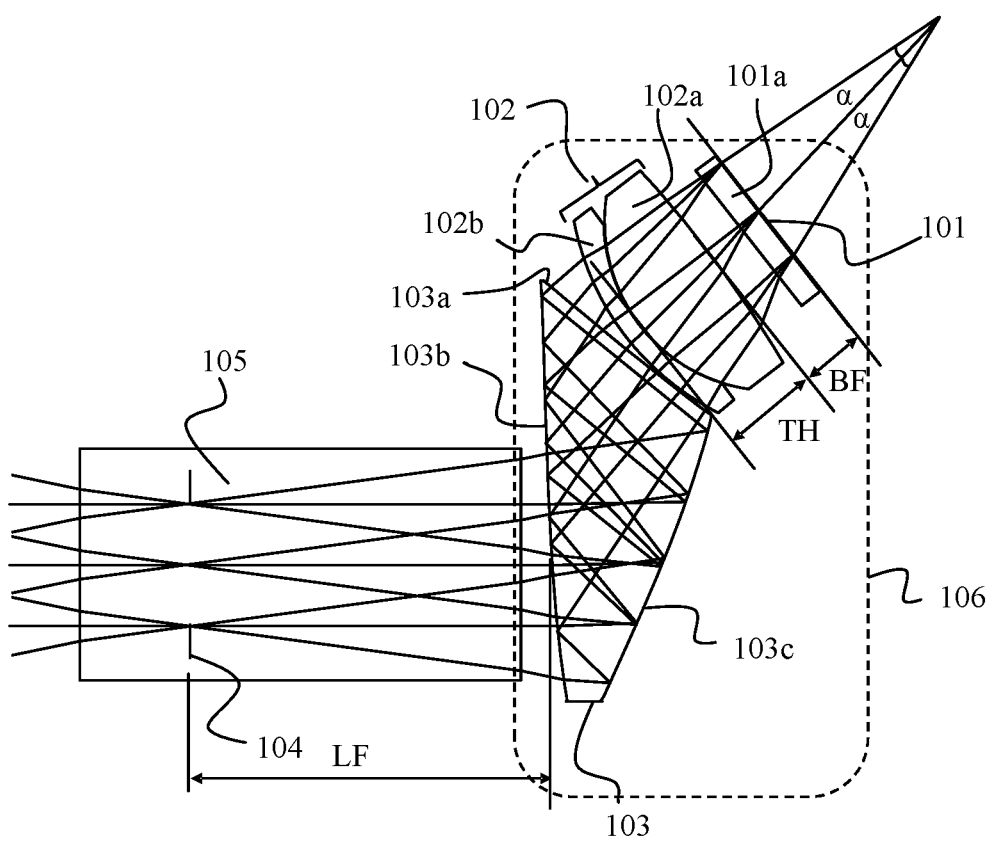
FIG. 1 illustrates a sectional view of a display apparatus according to a first embodiment.

First, a description will be given of the configuration of the display apparatus including the projection optical system in this embodiment with reference to FIG. 1. FIG. 1 is a sectional view of the display apparatus 106 in this embodiment. The display apparatus 106 includes a display element 101, a lens unit (a plurality of lenses) 102, and a free-formed surface prism (optical element, optical prism) 103. The projection optical system includes the lens unit 102 and the free-formed surface prism 103. The lens unit 102 includes a positive lens 102a and a negative lens 102b.

The light beam emitted from the display element 101 passes through the lens unit 102 and enters the free-formed surface prism 103. The display element 101 includes a cover glass 101a disposed between a display surface and the free-formed surface prism 103. The free-formed surface prism 103 includes three free-formed surfaces (optical surfaces): a transmission surface 103a (an entrance surface which the light beam enters from the plurality of lenses that configure the lens unit 102), a reflection/transmission surface 103b (an emission surface from which the light beam is emitted toward the exit pupil), and a reflection surface 103c (a reflection surface that reflects the light beam). After being emitted from the display element 101 and transmitted through the lens unit 102, the light beam passes through and enters the transmission surface 103a, then is totally reflected by the reflection/transmission surface 103b and enters the reflection surface 103c. The light beam reflected by the reflection surface 103c passes through and exits the reflection/transmission surface 103b, and reaches an exit pupil 104. That is, the light beam from the display element 101 enters the free-formed surface prism 103 via the plurality of lenses that configures the lens unit 102, is reflected a plurality of times inside the free-formed surface prism 103, and then is headed for the exit pupil. After being reflected the plurality of times and emitted by the free-formed surface prism 103, the light beam becomes a substantially parallel light beam at the pupil 104. The pupil 104 is disposed inside a solid substance corresponding to a head unit 105.

Figure 9:
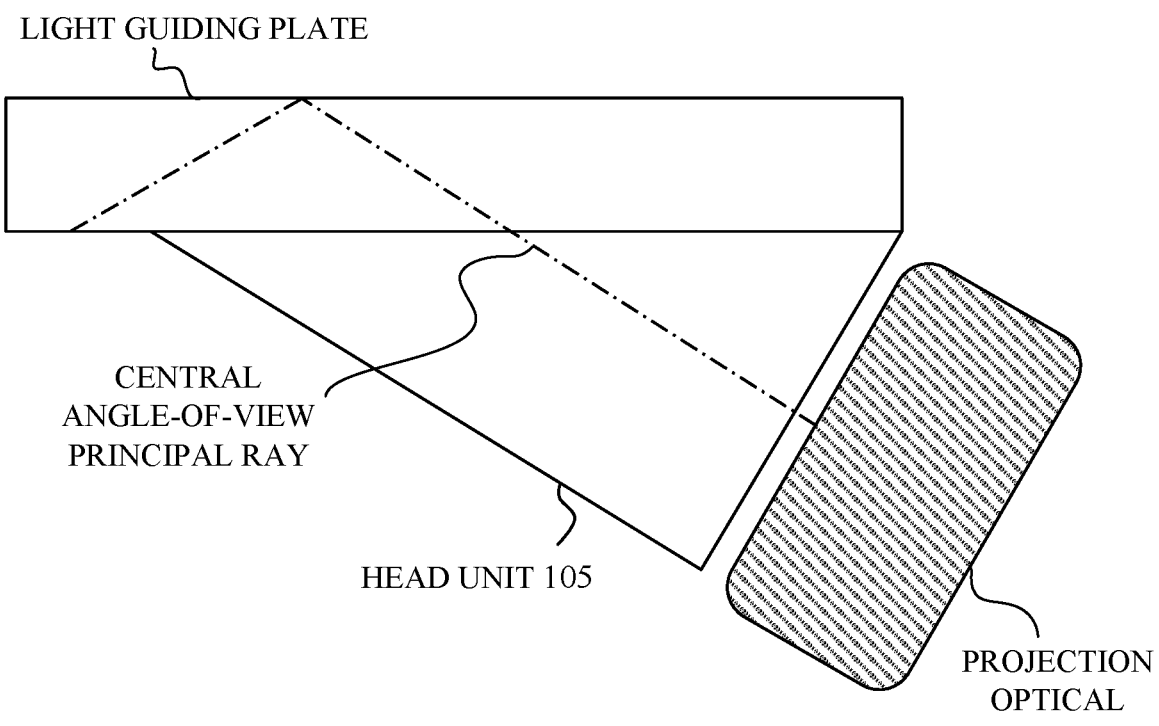
FIG. 9 illustrates an explanatory diagram of a head unit according to each embodiment.

FIG. 9 illustrates an explanatory diagram of the head unit 105. As illustrated in FIG. 9, the head unit 105 is disposed between a light guiding optical element and the projection optical apparatus, and is a structure for optically connecting those, in order to make the light beam emitted from the display apparatus 106 (ie, projection optical system) enter the light guiding optical element (light guiding element such as light guiding plate). The solid substance here is filled with a substance that is optically transparent and has a refractive index n larger than 1 under a used wavelength. For example, the solid substance is optical glass or optical plastic.

Now, conditions will be described for the chromatic aberration correction. The following expressions (1) and (2) represent an aberration coefficient L of an axial (or longitudinal) chromatic aberration and an aberration coefficient T of a lateral chromatic aberration, respectively.

$$L = \sum_{i=1}^{n} \frac{\phi_n}{v_n} h_n^2 = 0 \qquad (1)$$

$$T = \sum_{i=1}^{n} \frac{\phi_n}{v_n} h_n \cdot \overline{h_n} = 0 \qquad (2)$$

In the expressions (1) and (2), h represents a height of a ray passing through an outermost edge of the pupil in an on-axis light beam, and h bar represents a height of a principal ray in an off-axis light beam. $\varphi_1 \ldots \varphi_n$ and $v_1 \ldots v_n$ represent the refractive powers (optical powers) and Abbe numbers of the plurality of (n) lenses configuring the lens unit 102, respectively. When distances between adjacent lenses are very short, the following expressions (3) and (4) are established.

$$h1 = h2 = \ldots = hn \qquad (3)$$

$$\overline{h1} = \overline{h2} = \ldots = \overline{hn} \qquad (4)$$

That is, when the respective distances between the adjacent lenses are very short in the plurality of optical elements, the expressions (1) and (2) are expressed as the following expression (5).

$$A = \sum_{i=1}^{n} \frac{\phi_n}{v_n} = 0 \qquad (5)$$

Regarding the expression (2), it is sufficient if each h bar is the same in each of the plurality of optical elements. Thus, the expression (4) is established even when the lens unit has a telecentricity. In particular, the smaller the numerical value represented by the expression (5) becomes, the smaller an amount of the chromatic aberration becomes. By specifying a range satisfying the following conditional expression (6), the chromatic aberration in the lens unit 102 can be suppressed.

$$-0.01 < \sum_{m=1}^{n} \frac{\phi_m}{v_m} < 0.01 \qquad (6)$$

In the conditional expression (6), m (m=1 . . . n) represents an order of the plurality of lenses configuring the lens unit 102 counted from the display element 101 side, and $\varphi_m$ represents the optical power and $v_m$ represents the Abbe number of an m-th lens. If the value exceeds the lower limit or the upper limit of the conditional expression (6), the chromatic aberration correction in the lens unit 102 become an overcorrection or an under correction. If the chromatic aberration remains in the lens unit 102, the chromatic aberration remains in the image observed by the observer, and thus the observed image deteriorates.

The numerical range of the conditional expression (6) may be set to satisfy the following conditional expression (6a).

$$-0.008 < \sum_{i=1}^{n} \frac{\phi_n}{v_n} < 0.008 \qquad (6a)$$

The numerical range of the conditional expression (6a) may be set to satisfy the following conditional expression (6b).

$$-0.005 < \sum_{i=1}^{n} \frac{\phi_n}{v_n} < 0.005 \tag{6b}$$

The following conditional expression (7) may be satisfied as the conditional expression for establishing the expression (3).

$$|TH/fl| < 0.5 \tag{7}$$

In the conditional expression (7), TH represents a distance between the entrance surface and the exit surface of the ray in the lens unit 102, that is, a distance between a surface vertex of the surface closest to the display element 101 and a surface vertex of a surface farthest from the display element 101 among the plurality of lenses configuring the lens unit 102. In this embodiment, the distance TH represents a lens thickness of the lens unit 102. The represents a combined focal length of the plurality of lenses configuring the lens unit 102. When the conditional expression (7) is satisfied, a cemented structure is realized in which the positive lens 102a and the negative lens 102b are adjacent to each other, which are the plurality of lenses configuring the lens unit 102. The present invention is not limited to the cemented lenses described in this embodiment that are cemented to each other. By reducing the distance TH between the surface closest to the display element and the surface closest to the pupil in the lens unit 102, a configuration can be realized in which the plurality of optical elements is adjacent to each other.

The numerical range of the conditional expression (7) may be set to satisfy the following conditional expression (7a).

$$|TH/fl| < 0.4 \tag{7a}$$

The following conditional expression (8) may be satisfied as a condition indicating the telecentricity which is one of the conditions for satisfying the expression (4).

$$0 < \alpha < 10 \tag{8}$$

In the conditional expression (8), when each light beam in the angle of view emitted from the display element 101 and entering the exit pupil is defined, α (degree) represents the largest angle in angles each of which is formed by the principal ray of the light beam at a center of the angle of view and another principal ray emitted from the display element 101 (that is, the maximum value of the angles each of which is formed by the principal ray at a central angle of view and another principal rays incident on the exit pupil). Here, the principal ray of the light beam at the center of the angle of view is the principal ray of the light beam at the angle center, that is, a central angle-of-view principal ray. The conditional expression (8) indicates that the lens unit 102 has the optical configuration with a high telecentricity. By satisfying such a condition, the lens unit 102 can suppress the lateral chromatic aberration.

The following conditional expression (9) may be satisfied.

$$0.1 < |\varphi_L/\varphi_P| < 0.8 \tag{9}$$

In the conditional expression (9), $\varphi_L$ represents a combined optical power of the plurality of lenses configuring the lens unit 102, and $\varphi_P$ represents the optical power of the entire projection optical system. When the optical power $\varphi_L$ of the lens unit 102 has a certain value or more, the chromatic aberration is likely to occur, and the chromatic aberration correction is required. When the value is smaller than the lower limit of the conditional expression (9), the optical power $\varphi_L$ of the lens unit 102 decreases, and the chromatic aberration in the lens unit 102 is less likely to occur. When the value is larger than the upper limit of the conditional expression (9), it is difficult for the lens unit 102 to correct the chromatic aberration.

The numerical range of the conditional expression (9) may be set to satisfy the following conditional expression (9a).

$$0.1 < |\varphi_L/\varphi_P| < 0.6 \tag{9a}$$

The lens unit 102 as a lens unit in this embodiment is the cemented lens of the negative lens 102b and the positive lens 102a. Here, $\varphi_{102a}$ and $\varphi_{102a}$ represent the optical power and the Abbe number in the positive lens 102a, and $\varphi_{102n}$ and $v_{102b}$ represent the optical power and the Abbe number in the negative lens 102b, respectively. The lens unit 102 in this embodiment satisfies the following expression (10).

$$(\varphi_{102a}/v_{102a}) + (\varphi_{102n}/v_{102n}) = -0.00142 \tag{10}$$

Since the expression (10) satisfies the conditional expression (6), the occurrence of the chromatic aberration can be suppressed.

Since the lens unit 102 takes fl=28.99 mm and TH=5.3 mm, the following expression (11) is established.

$$|TH/fl| = 0.183 \tag{11}$$

The expression (11) satisfies the conditional expression (7).

Regarding an exit angle (maximum angle α) of the ray, the following expression (12) is established.

$$\alpha = 5.744 \tag{12}$$

Since the expression (12) satisfies the conditional expression (8), the occurrence of the lateral chromatic aberration can be suppressed.

Since the optical power $\varphi_P$ of the entire system is 0.0716 and the optical power $\varphi_L$ of the lens unit 102 is 0.0345, the following expression (13) is established.

$$|\varphi_L/\varphi_P| = 0.48 \tag{13}$$

The expression (13) satisfies the conditional expression (9).

The lens unit 102 in this embodiment is the lens having the positive power acquired by cementing the negative lens 102b and the positive lens 102a, but the lens unit 102 is not limited to this embodiment. When Abbe numbers and optical powers of glass materials of then lenses configuring the lens unit 102 are $v_1, v_2, \ldots, v_n$, and $\varphi'_1, \varphi'_2, \ldots, \varphi'_n$, the lens unit 102 may include all the lenses which include both the optical element having $\varphi'_n/v_n$ of a positive value and the optical element having $\varphi'_n/v_n$ of a negative value. For example, the lens unit 102 may include, instead of a concave lens (negative lens 102b), an optical element having a DOE element mounted on the surface of the positive lens 102a. The lens unit 102 may include an optical element in which three or more lenses are cemented, or a lens unit in which the positive lens and the negative lens are separated. Further, the entire optical power may be negative in the plurality of lenses configuring the lens unit 102.

In order to satisfy the conditional expression (8), the lens unit 102 requires the optical configuration having a high telecentricity. The lens unit 102 is not limited to the configuration in which the lens unit 102 is disposed between the free-formed surface prism 103 and the display element 101 as described in this embodiment, and may be disposed between the pupil 104 and the free-formed surface prism

103. However, when the lens unit 102 is disposed between the pupil 104 and the free-formed surface prism 103, it is difficult to satisfy the conditional expression (8) for the light beam having a large angle of view. Thus, the lens unit 102 may be disposed between the free-formed surface prism 103 and the display element 101.

When the plurality of lenses configuring the lens unit 102 has the positive power as a whole and includes two lenses, the two lenses may be a combination of a negative meniscus lens (meniscus lens) and a positive biconvex lens. When such a combination is used, the distance is short between a principal plane of the negative lens and the principal plane of the positive lens, and it is easy to establish the expression (3). When the lens unit 102 has the negative power, for the same reason, a combination may be used of a negative biconcave lens and a positive meniscus lens.

As well as in the lens unit 102, it is necessary to suppress the occurrence of the chromatic aberration in the other optical element that is the free-formed surface prism 103. On each optical surface of the free-formed surface prism 103, the following expression (14) defines an optical power $\varphi_j$ at an intersection with the central angle-of-view principal ray in a yz plane, where $R_j$ represents a radius curvature of the optical surface at each intersection.

$$\varphi_j = (n-1)/R_j \tag{14}$$

In the expression (14), n represents the refractive index of the medium configuring the free-formed surface prism 103. In the free-formed surface prism 103, the chromatic aberration occurs on the transmission surface only. In order to reduce the chromatic aberration generated on the transmission surface, it is necessary to cancel the chromatic aberration on the entrance surface and on the exit surface, or to reduce the occurrence itself of the chromatic aberration by reducing the optical powers on the entrance surface and on the exit surface. However, from a viewpoint of the aberration correction, the configuration may not be preferable in which the entrance surface and the exit surface have powers to cancel the generated chromatic aberration, as described later. Thus, the configuration may be used of reducing the optical power of the transmission surface of the free-formed surface prism 103.

In this embodiment, for an optical power $\varphi_i$ in the yz plane on the entrance surface and for an optical power $\varphi_o$ in the yz plane on the exit surface of the free-formed surface prism 103 (when, at an intersection in a section including an optical axis with a principal ray incident on a central angle of view of the exit pupil, $\varphi_i$ represents an optical power of the entrance surface and $\varphi_o$ represents an optical power of the emission surface), the following conditional expressions (15) and (16) may be satisfied.

$$-0.01 < \varphi_i < 0.01 \tag{15}$$

$$-0.01 < \varphi_o < 0.01 \tag{16}$$

By providing such an optical power, the free-formed surface prism 103 can suppress the occurrence of the chromatic aberration.

In the free-formed surface prism 103 in this embodiment, the chromatic aberration occurs on the transmission surface (entrance surface) 103a and the transmission portion (exit surface) of the reflection/transmission surface 103b only. In the yz plane, the following expressions (17) and (18) respectively express the optical power $\varphi_{103a}$ at the intersection of the transmission surface 103a and the central angle-of-view principal ray and the optical power $\varphi_{103b}$ at the intersection of the transmission portion of the reflection/transmission surface 103b and the central angle-of-view principal ray. The expressions (17) and (18) satisfy the conditional expressions (15) and (16).

$$\varphi_{103a} = 0.00557 \tag{17}$$

$$\varphi_{103b} = 0.00567 \tag{18}$$

Figure 2:
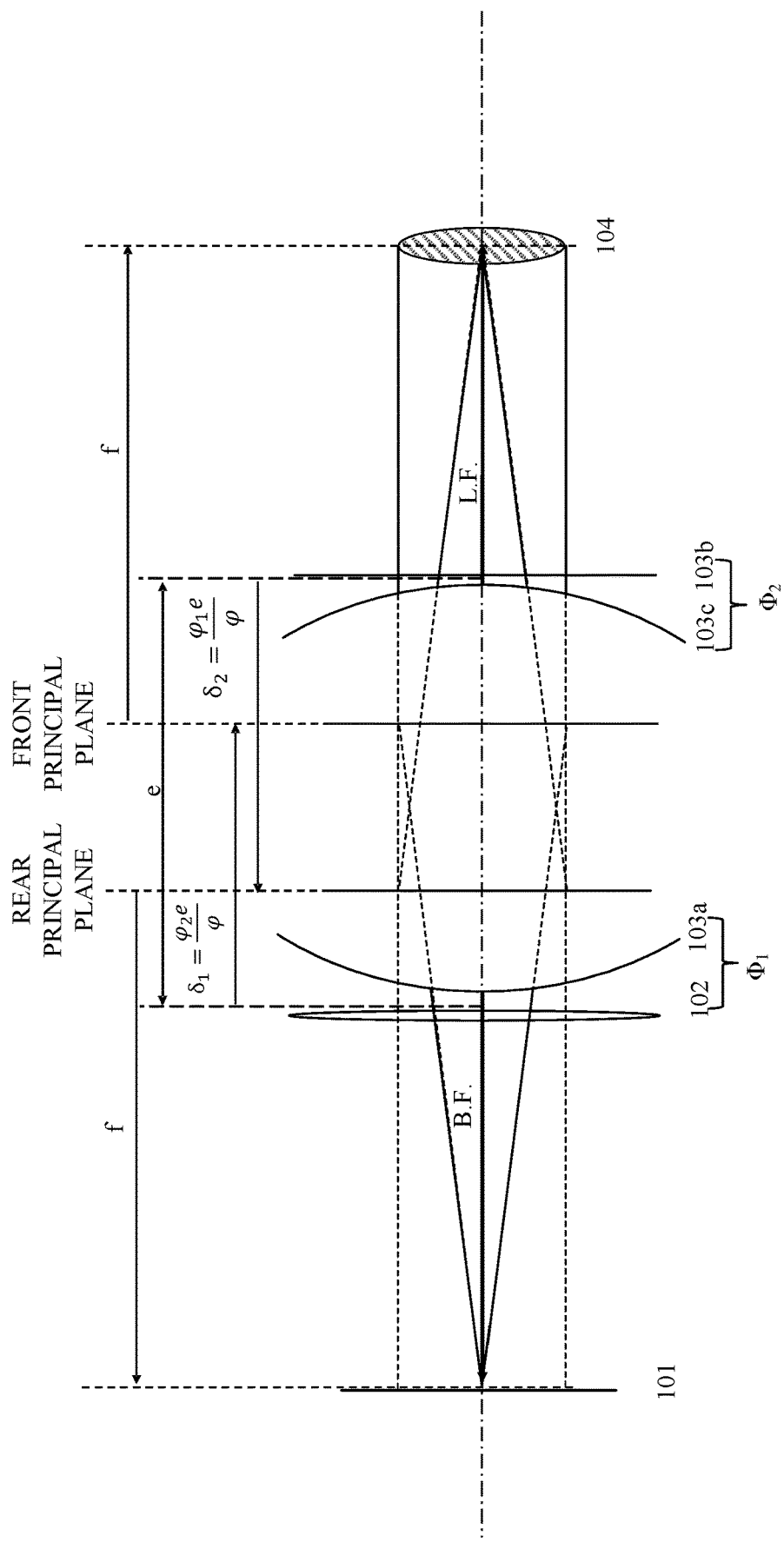
FIG. 2 illustrates an explanatory diagram of an optical power configuration according to the first embodiment.
Figures 3A, 3B, 3C:
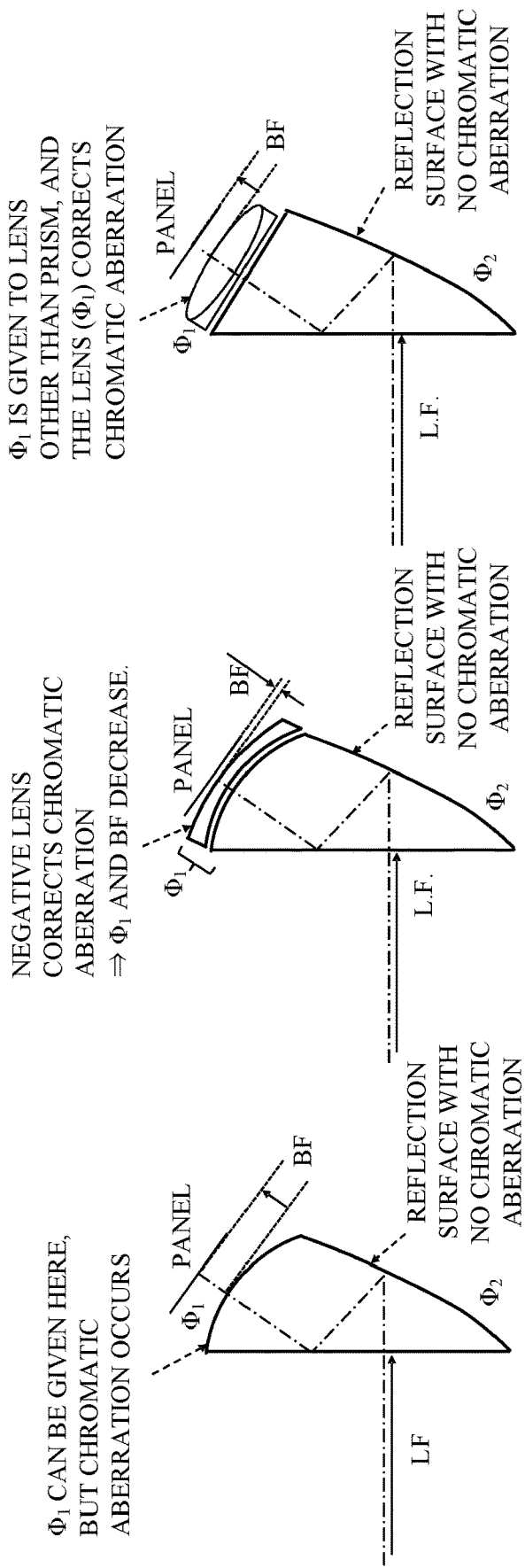
FIGS. 3A to 3C illustrate explanatory diagrams for lens unit configurations according to the first embodiment.

Next, referring to FIGS. 2 and 3A to 3C, a reason will be described for why the plurality of optical elements is required in this embodiment, that is, why the free-formed surface prism 103 alone cannot achieve both the configuration for reducing the occurrence of the chromatic aberration and the optical power configuration and why the lens unit 102 is required. FIG. 2 illustrates an explanatory diagram of the optical power configuration. FIGS. 3A to 3C illustrate explanatory diagrams of the lens unit configurations. A description given here is for the optical power configuration in a section in the paper plane (yz plane) in this embodiment. The central angle-of-view principal ray is defined by the light beam that passes through the center of the pupil 104, that passes through the center of the angle of view among the light beam in the angle of view in the paper plane, and that passes through the central angle of view among the light beams in the angles of view in a direction orthogonal to the paper plane.

As illustrated in FIG. 2, the optical power of the optical system in this embodiment includes the optical power of each surface of the free-formed surface prism 103 and the optical power of the lens unit 102. In FIG. 2, $\Phi_1$ represents a combined optical power of the transmission surface 103a and of the lens unit 102, and $\Phi_2$ represents a combined optical power of the reflection/transmission surface 103b and of the reflection surface 103c. LF represents a distance between the pupil 104 and the reflection/transmission surface 103b, and BF represents a distance between the lens unit 102 and the display element 101.

Once an observation angle of view and the size of the display element 101 are fixed, the focal length (optical power) of the entire projection optical system is fixed. Depending on the combination of the light guiding optical element and the projection optical system, it may be desirable to increase or decrease the distance LF according to the configuration of the light guiding optical element. The distance LF may be increased or decreased by moving the principal plane position of the projection optical system. In the free-formed surface prism 103, it is assumed that the main optical power is on the reflection surface 103c, and the principal plane position of the free-formed surface prism 103 is in the vicinity thereof. If there is no optical element other than the free-formed surface prism 103, the entire principal plane of the projection optical system substantially matches the principal plane position of the free-formed surface prism 103. That is, the length of the distance LF is also almost fixed. In this case, in order to move the principal plane position to change the distance LF, it is necessary to give the optical power to the transmission surface 103a or to the reflection/transmission surface 103b. Similarly, in order to increase the distance BF, it is necessary to give the optical power to the transmission surface 103a or to the reflection/transmission surface 103b. If the optical power is given to the refraction surface as described above, the chromatic aberration occurs unless a cancellation relationship is established between the transmission surface 103a and the reflection/transmission surface 103b, which are the two refraction surfaces. If the optical power is given to the reflection/transmission surface 103b which the light beam obliquely enters at a large angle so as to satisfy the condition for the total reflection, a large decentering aberration occurs and the optical performance deteriorates. Thus, the reflection/transmission surface 103b may have a small optical power. As described above, it is difficult for the free-formed surface prism 103 alone to largely move the principal plane while the chromatic aberration is suppressed.

As illustrated in FIG. 3B, there is also a method of disposing a lens adjacent to the transmission surface 103a or the reflection/transmission surface 103b and of establishing an achromatic condition between the lens and the free-formed surface prism 103. However, for example, when the lens is disposed adjacent to the transmission surface 103a as illustrated in FIG. 3B, the lens may serve to reduce the optical power $\Phi_i$ which the lens gives to the transmission surface 103a, and it is difficult to largely move the principal plane position.

On the other hand, in the optical system in this embodiment, each of the reflection/transmission surface 103b and the transmission surface 103a is set to nearly a planar surface having the optical power as small as possible. Further, the optical power $\Phi_i$ required on the display element 101 side is separated from the free-formed surface prism 103, and the optical power is assigned to the lens unit 102 (FIG. 3C). At this time, since the transmission surface 103a is nearly the planar surface, the chromatic aberration becomes very small. The lens unit 102 singularly performs an achromatization on the remained chromatic aberration generated by the optical power $\Phi_i$ of the lens unit 102 and suppresses the occurrence of the chromatic aberration in the entire projection optical system. By selecting the optical power $\Phi_1$, the position of the principal plane of the projection optical system can be changed and the distance LF or the distance BF can be set to a desired length. Regarding the optical power $\Phi_2$, because the reflection/transmission surface 103b has the configuration close to the planar surface, the optical power $\Phi_2$ substantially matches the power of the reflection surface 103c. Thus, the optical power $\Phi_2$ hardly generates the chromatic aberration.

In the optical system in FIG. 1, both the optical powers $\Phi_1$ and $\varphi_2$ take positive values so that the distance LF is relatively close to the focal length of the entire system of the projection optical system, and that the distance BF has a certain value so as to easily dispose the display element 101. However, the power configuration is not limited to this embodiment. For example, when it is desired to make the distance LF larger than the focal length, the lens unit 102 is configured to have the negative power as the optical power $\Phi_1$. On the other hand, when the distance BF needs to be increased, the optical power of the free-formed surface prism 103 may have the negative power as the optical power $\Phi_2$.

According to the above configuration, this embodiment can provide a high-quality image to the observer while suppressing the occurrence of the chromatic aberration, by correcting the chromatic aberration at each of the free-formed surface prism 103 and the lens unit 102 described above, and by combining these two optical element units.

In this embodiment, the lens unit 102 is a rotationally symmetric lens. In the free-formed surface prism 103, if the focal positions are largely different in the yz plane and in a section parallel to an xz plane, an astigmatism occurs and the lens unit 102 cannot provide the correction. As a result, the observed image is deteriorated. In particular, as described above, the reflection surface 103c has most of the optical power of the free-formed surface prism 103, and both the transmission surface 103a and the reflection/transmission surface 103b have small optical powers. Thus, it is important not to generate the astigmatism on the reflection surface 103c.

As described above, in this embodiment, the free-formed surface prism 103 includes at least three optical surfaces which include a plurality of transmission surfaces. The reflection surface 103c of the free-formed surface prism 103 has a symmetry axis (axis of symmetry). The yz plane is defined by a plane including the center of the pupil 104 and the symmetry axis (a first section is defined as a plane including the center of the exit pupil and the axis of symmetry). The xz plane is defined by a plane orthogonal to the yz plane and including the central angle-of-view principal ray (a second section is defined as a plane orthogonal to the first section and includes the principal ray). At the farthest intersection in the yz plane from the pupil 104 among the intersections of the reflection surface 103c and the principal ray of the light beam in the angle of view passing through the pupil 104 (a farthest intersection on the first section from the exit pupil among intersections of the reflection surface and the principal ray incident on the exit pupil), Ry represents a radius curvature of the reflection surface 103c in the yz plane (first section), and Rx represents a radius curvature of the reflection surface 103c in a section parallel to the xz plane (second section). At this time, the following conditional expression (19) may be satisfied.

$$1 < Ry/Rx < 5 \tag{19}$$

If the value is smaller than the lower limit of the conditional expression (19), it is difficult to suppress the astigmatism caused by the light beam obliquely entering the reflection surface 103c at the large angle. On the other hand, if the value is larger than the upper limit of the conditional expression (19), the optical power increases in the section parallel to the xz plane, and an opposite astigmatism occurs. When such a relationship is established between the curvature radii, it is possible to suppress the occurrence of the astigmatism on the reflection surface 103c. In this embodiment, the free-formed surface prism 103 takes Rx/Ry=1.74, which satisfies the conditional expression (19).

Further, when the lens unit 102 is configured by the combination of the negative lens 102b and the positive lens 102a, the positive lens 102a may be disposed on the display element 101 side. When the plurality of lenses configuring the lens unit 102 is arranged in this way, the distance BF is ensured and the distance between the free-formed surface prism 103 and the lens unit 102 is ensured, making it easy to dispose the optical system.

Second Embodiment

Figure 4:
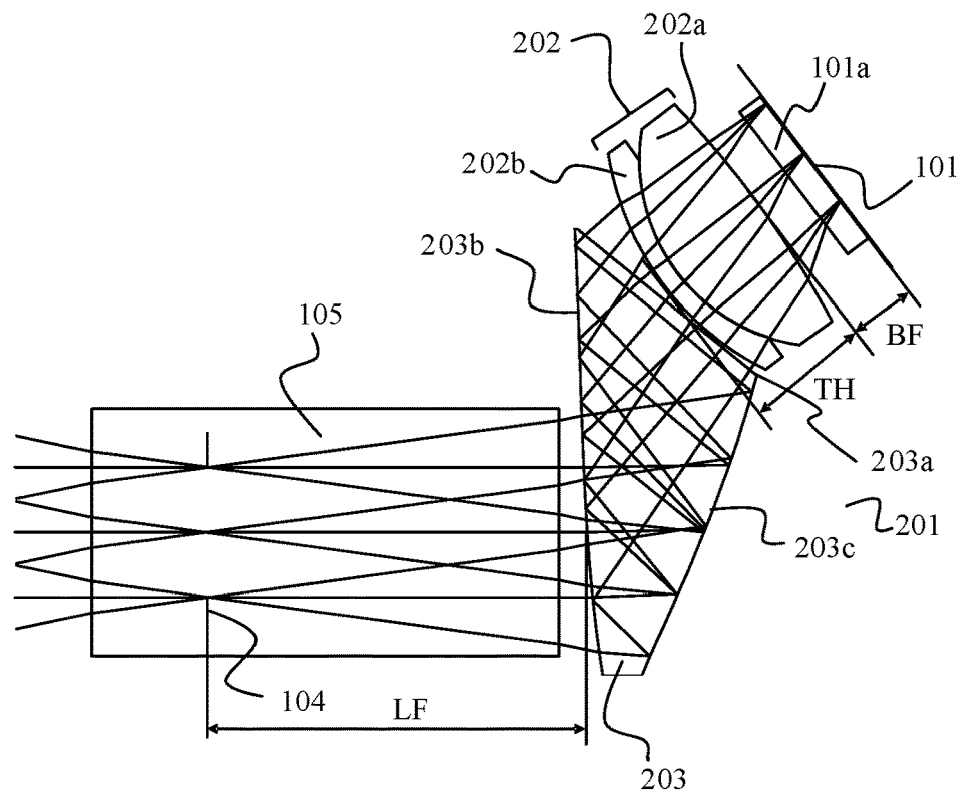
FIG. 4 illustrates a sectional view of a display apparatus according to a second embodiment.

Next, with reference to FIG. 4, the configuration will be given of the display apparatus including the projection optical system in the second embodiment of the present invention. FIG. 4 illustrates a sectional view of the display apparatus in this embodiment.

The display apparatus includes the display element 101, a lens unit 202, and a free-formed surface prism (optical prism) 203. The projection optical system is configured by the lens unit 202 and the free-formed surface prism 203. The lens unit 202 includes a positive lens 202a and a negative lens 202b. The free-formed surface prism 203 includes three optical surfaces: a transmission surface 203a, a reflection/transmission surface 203b, and a reflection surface 203c. In this embodiment, the members having the same reference numerals as those in the first embodiment have the same functions as those in the first embodiment. This also applies to the following embodiments. The projection optical system in this embodiment is an embodiment in which one of the surfaces is the planar surface in the free-formed surface prism 203.

The first embodiment has the configuration that does not generate the chromatic aberration in the entire free-formed surface prism 103, by reducing the optical powers of the transmission surface 103a and the reflection/transmission surface 103b in the three optical surfaces forming the free-formed surface prism 103, and by maintaining the main optical power in the reflection surface 103c. On the other hand, this embodiment sets the transmission surface 203a of the free-formed surface prism 203 to the planar surface and configured it not to have the optical power.

As illustrated in FIG. 4, similarly to the first embodiment, the projection optical system in this embodiment is a rear diaphragm optical system in which the light beam emitted from the display element 101 passes through the plurality of optical elements including in order of the lens unit 202 and the free-formed surface prism 203, and thereafter forms the pupil 104. Similarly to that in the first embodiment, the projection optical system in this embodiment is an optical system that emits the light beam to the light guiding element (light guiding optical element), and the light beam forms the pupil 104 in the light guiding element.

Similarly to the first embodiment, in order to correct the chromatic aberration generated in the lens unit 202, the lens unit takes $(\varphi_{202a}/\nu_{202a})+(\varphi_{202b}/\nu_{202b})=-0.00122$, which satisfies the conditional expression (6). Here, $\varphi_{202a}$ and $\nu_{202a}$ represent the optical power and the Abbe number in the positive lens 202a, and $\varphi_{202b}$ and $\nu_{202b}$ represent the optical power and the Abbe number in the negative lens 202b, respectively.

The distance TH between the entrance surface (the surface of the positive lens 202a) and the exit surface (the surface of the negative lens 202b) of the ray in the lens unit 102, and the combined focal length fl of the pluralities of lenses forming the lens unit 102 are TH=5.3 mm and fl=26.30 mm, respectively. Thus, the following expression (20) is established which satisfies the conditional expression (7).

$$|TH/fl|=0.201 \tag{20}$$

The following expression (21) represents the maximum angle $\alpha$ (degree) of the angles each of which is formed by the principal ray of the light beam in the center of the angle of view and one of the principal rays of the light beam emitted from the display element 101. The expression (21) satisfies the conditional expression (8).

$$\alpha=7.717 \tag{21}$$

The free-formed surface prism 203 includes three optical surfaces: a transmission surface 203a, a reflection/transmission surface 203b, and a reflection surface 203c. The transmission surface 203a is a planar surface. Thus, an optical power $\varphi_{203a}$ on the transmission surface 203a is 0. That is, in the free-formed surface prism 203, the surface generating the chromatic aberration is the reflection/transmission surface 203b only. The following expression (22) represents a power $\varphi_{203b}$ at the intersection of the transmission portion and the central angle-of-view principal ray on the reflection/transmission surface 203b. The expression (22) satisfies the conditional expression (16).

$$\varphi_{203b}=0.00536 \tag{22}$$

Such a configuration can eliminate the chromatic aberration generated on the transmission surface 203a, suppress the chromatic aberration generated on the reflection/transmission surface 203b, and suppress the chromatic aberration generated on the free-formed surface prism 203.

The optical power $\varphi_P$ of the entire projection optical system is 0.0716, and the optical power $\varphi_L$ of the lens unit 202 is 0.0345. Thus, the following expression (23) is established which satisfies the conditional expression (9).

$$|\varphi_L/\varphi_P|=0.53 \tag{23}$$

Further, this embodiment facilitates processing in manufacturing the free-formed surface prism 203 by using the planar surface for one of the three optical surfaces forming the free-formed surface prism 203.

Third Embodiment

Figure 5:
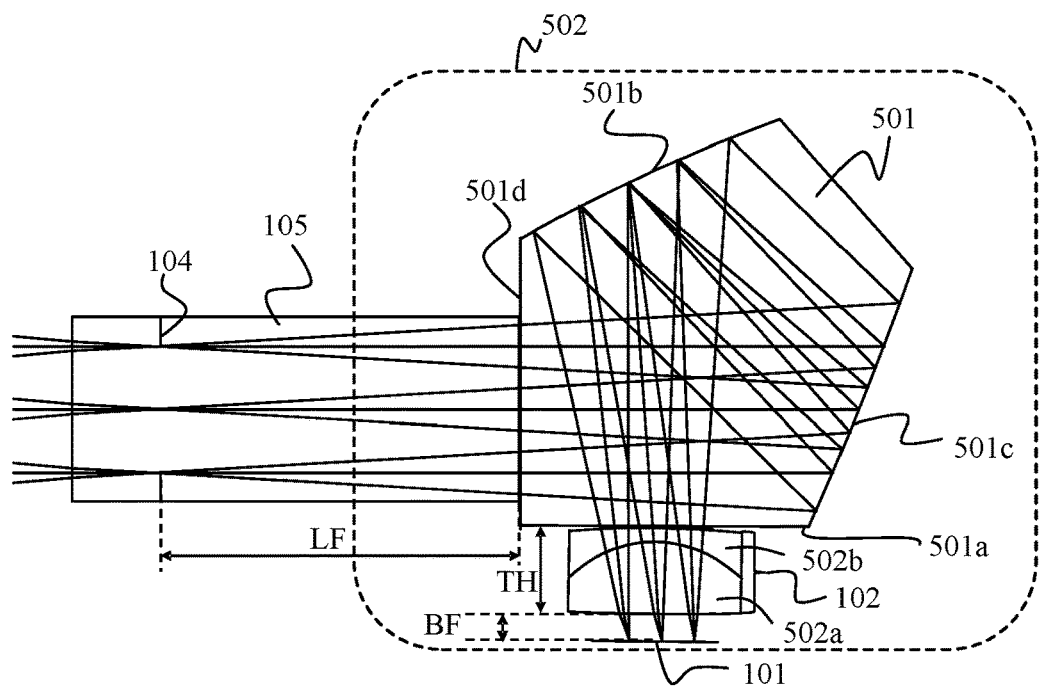
FIG. 5 illustrates a sectional view of a display apparatus according to a third embodiment.

Next, a description will be given of the configuration of the display apparatus including the projection optical system in the third embodiment of the present invention with reference to FIG. 5. FIG. 5 illustrates a sectional view of a display apparatus 503 in this embodiment.

The display apparatus 503 includes the display element 101, a lens unit 502, and a free-formed surface prism (optical prism) 501. The projection optical system includes the lens unit 502 and the free-formed surface prism 501. The free-formed surface prism 501 includes four optical surfaces: a transmission surface 501a, reflection surfaces 501b and 501c, and a transmission surface 501d. The projection optical system in this embodiment includes the free-formed surface prism 501 having two surfaces of free-formed reflection surfaces and two surfaces of planar transmission surfaces, and the lens unit 502.

As illustrated in FIG. 5, similarly to the first embodiment, the projection optical system in this embodiment is a rear diaphragm optical system in which the light beam emitted from the display element 101 passes through the optical elements including in order of the lens unit 502 and the free-formed surface prism 501, and thereafter forms the pupil 104. Similarly to the first embodiment, in the projection optical system in this embodiment, the light beam emitted from the projection optical system enters the light guiding element (light guiding optical element), and forms the pupil 104 in the light guiding element. Specifically, the light beam emitted from the display element 101 passes through the lens unit 502 and then enters the transmission surface 501a of the free-formed surface prism 501. The light beam incident on the free-formed surface prism 501 is reflected by the reflection surfaces 501b and 501c, then exits through the transmission surface 501d and forms the pupil 104.

In contrast to the free-formed surface prism including three optical surfaces such as that in the first embodiment or the second embodiment, in the free-formed surface prism including four optical surfaces in this embodiment, it is possible to distribute the optical power corresponding to the optical power $\Phi_2$ of the first embodiment among the two reflection surfaces 501b and 501c. Hence, it is possible to reduce the optical power of each optical surface, and the improved performance can be expected. However, in order to ensure effective areas for the four optical surfaces, the free-formed surface prism is likely to be large.

Since the free-formed surface prism 501 in this embodiment has two reflection surfaces 501b and 501c, it is easy to correct the aberration in the free-formed surface prism 501. In the free-formed surface prism 501 in this embodiment, both the two transmission surfaces 501a and 501d are configured to be the planar surfaces. Thereby, in the free-formed surface prism 501, the following expression (24) is satisfied for all the refraction surfaces, and the conditional expressions (15) and (16) are satisfied.

$$\varphi = 0 \tag{24}$$

In this embodiment, regarding the lens unit 502, $\varphi_{502a}$ and $\nu_{502a}$ represents the optical power and the Abbe number of the positive lens 502a, and $\varphi_{502b}$ and $\nu_{502b}$ represents the optical power and the Abbe number of the negative lens 502b, respectively. At this time, the following expression (25) is established which satisfies the conditional expression (6).

$$(\varphi_{502a}/\nu_{502a}) + (\varphi_{502b}/\nu_{502b}) = -0.00116 \tag{25}$$

With the configuration combining the lens unit 502 and the free-formed surface prism 501, it is possible to suppress the occurrence of the chromatic aberration in the entire projection optical system 503.

The following expressions (26) and (27) represent the distance TH (mm) between the positive lens 502a (light incident surface) and the negative lens 502b (exit surface) in the lens unit 502, and the combined focal length fl (mm) of the plurality of lenses configuring the lens unit 102, respectively. The expressions (26) and (27) satisfy the conditional expression (7).

$$TH = 4.8 \tag{26}$$

$$fl = -1783 \tag{27}$$

The following expression (28) represents the maximum angle α (degree) of angles each of which is formed by the optical axis of the lens unit 102 and one of the principal rays of the light beams emitted from the display element 101. The following expression (28) satisfies the conditional expression (8).

$$\alpha = 2.27 \tag{28}$$

Fourth Embodiment

Figure 10:
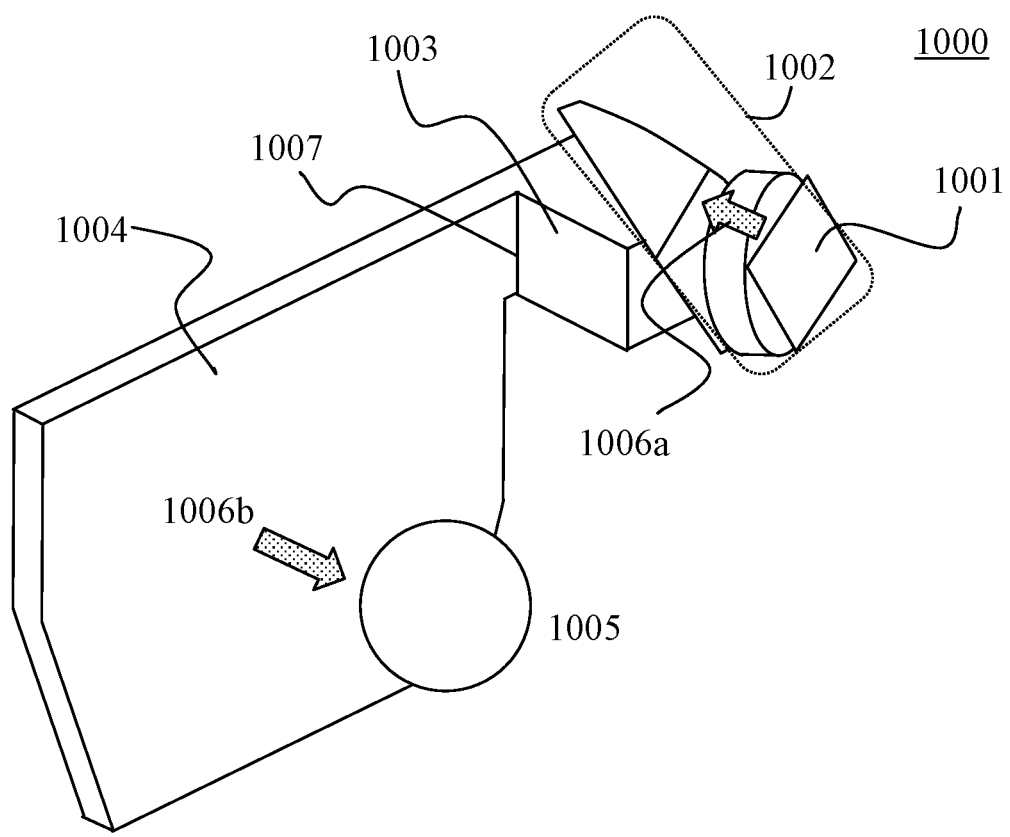
FIG. 10 illustrates a configuration diagram of a display apparatus according to a fourth embodiment.

Next, a description will be given of the display apparatus in the fourth embodiment of the present invention with reference to FIG. 10. FIG. 10 illustrates a block diagram of a display apparatus 1000 in this embodiment. The display apparatus 1000 has, for example, any of the projection optical system of each embodiment described above.

Alight beam 1006a emitted from a display element 1001 forms the exit pupil through a projection optical system 1002 and enters a head unit 1003. The light beam 1006a is guided while being reflected inside a planar plate by a light guiding element 1004 which is disposed so as to match the exit pupil of the projection optical system 1002 and an entrance portion 1007 of the light guiding element 1004. Alight beam 1006b emitted from the light guiding element 1004 enters the observer's eye 1005 and is observed as a two-dimensional image by the observer. Since the exit pupil of the projection optical system 1002 is disposed so that the exit pupil matches the entrance portion 1007 of the light guiding element 1004, the light guiding element 1004 guides the light while being filled with the light beam. Thus, the observer can observe a continuous image.

This embodiment can provide the observer with a bright image with a small decrease in light amount by guiding the light inside the light guiding element 1004 with a repetition of the total reflection. Further, the light guiding element 1004 is formed only by the planar surface having no optical power. Having such a configuration, this embodiment can provide the observer with the same angle of view formed by the projection optical system 1002 via the light guiding element 1004.

Next, a description will be given of the numerical examples 1 to 3 corresponding to the first to third embodiments. In the description for each embodiment, the explanation is given in order from the optical path on the light source side, but for each numerical example, a description is given in reverse order in which the ray is traced from the pupil position side of the projection optical system.

Tables 1 to 9 describe each numerical example. In the description, the reference of the absolute coordinate system is described as a Global origin. Tables 1 to 3 correspond to the first embodiment, Tables 4 to 6 correspond to the second embodiment, and Tables 7 to 9 correspond to the third embodiment. The three-dimensional coordinate axes in the absolute coordinate system are the Z axis, Y axis, and X axis, and each axis is defined as follows.

Z axis is a straight line passing from the center of the zeroth surface to the center of the first surface (absolute coordinate origin), and this direction being positive.

Y axis is a straight line passing through the center of the first surface (absolute coordinate origin) and forming 90 degrees counterclockwise with the Z axis.

X axis is a straight line passing through the origin and orthogonal to the Z axis and Y axis.

A surface shape of an i-th surface configuring the optical system is represented by setting a local coordinate system and by using a function based on the local coordinate system. A tilt angle in the YZ plane of the i-th surface is represented by an angle θgi (degree) with respect to the Z axis of the absolute coordinate system where the counterclockwise direction is assumed to be positive. In this embodiment, the tilt angle is set in the YZ plane only. The y axis and the z axis of the local coordinate system (x, y, z) of the i-th surface are in the YZ plane of the absolute coordinate system, and tilt by the angle θgi (degree) in the YZ plane. The z, y, and z axes are defined as follows.

The z axis is a straight line that passes through the origin of the local coordinate system and forming Oi with the Z axis of the absolute coordinate system in the counterclockwise direction in the YZ plane.

The y axis is a straight line passing through the origin of the local coordinate system and forming 90 degrees with the z direction in the counterclockwise direction in the YZ plane.

The x axis is a straight line passing through the origin of the local coordinates and orthogonal to the YZ plane.

Ndi and vdi represent the refractive index for the d-line and the Abbe number between the i-th surface and the (i+1)-th surface, respectively.

The following expression (29) expresses the surface shape which does not have the rotationally symmetry axis and used in each numerical example. This surface shape corresponds to each rotationally asymmetric surface (denoted as XYP) in each numerical example.

$$z = \frac{cr^2}{1 + \sqrt{1 - (1+k)c^2 r^2}} + c2x + c3y + c4x^2 + c5xy + c6y^2 + c7x^3 + \tag{29}$$
$$c8x^2 y + c9xy^2 + +c10y^3 + c11x^4 + c12x^3 y + c13x^2 y^2 + c14xy^3 +$$
$$c15y^4 + c16x^5 + c17x^4 y + c18x^3 y^2 + c19x^2 y^3 + c20xy^4 + c21y^5 +$$
$$c22x^6 + c23x^5 y + c24x^4 y^2 + c25x^3 y^3 + c26x^2 y^4 + c27xy^5 +$$

-continued $$c28y^6 + c29x^7 + c30x^6y + c31x^5y^2 + c32x^4y^3 + c33x^3y^4 +$$
$$c34x^2y^5 + c35xy^6 + c36y^7 + c37x^8 + c38x^7y + c39x^6y^2 +$$
$$c40x^5y^3 + c41x^4y^4 + c42x^3y^5 + c43x^2y^6 + c44xy^7 + c45y^8$$

This function defines the surface shape by using the local coordinate (x, y, z) of the i-th surface. In the above function, when 0 is set to each term having x of an odd order in the local coordinate system, it is possible to obtain a surface symmetric to the yz plane.

In each embodiment, the surface vertex of each surface has shift eccentricities in the y and z axes directions and a tilt eccentricity around the x axis only. Thus, a conventional meridional section and a local meridional section are the same section, but a conventional sagittal section and a local sagittal section of each surface are different.

In each numerical example, each of Tables 1, 3, and 5 represents the positions of the local origins for each surface. In the Tables 1, 3, and 5, if a surface has Yg, Zg, and θg columns with numerical values, the surface has its origin at a point rotated by the numerical values around the X axis, Y axis and Z axis from the surface described as the Global origin. If a surface has the above columns with no numerical value, the surface is located at a position moved by a distance of D in the Z axis direction from a forward surface. The coordinate system described in FIGS. 6, 7, and 8 indicates the position of the Global origin and the direction of the coordinate system. XYP represents a surface having the free-formed surface shape and SPH represents a surface of the spherical surface, and each coefficient is indicated in attached tables. M represents that the surface is the reflection surface.

Numerical Example 1

Figure 6:
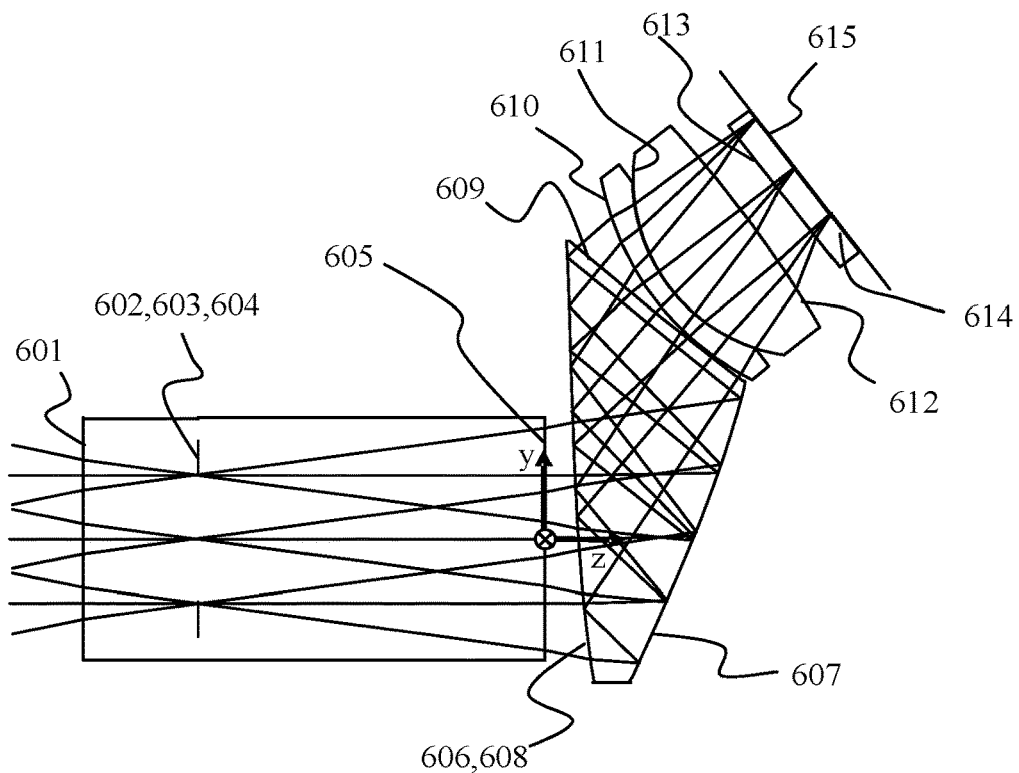
FIG. 6 illustrates a sectional view of a display apparatus according to a numerical example 1.
Figure 11:
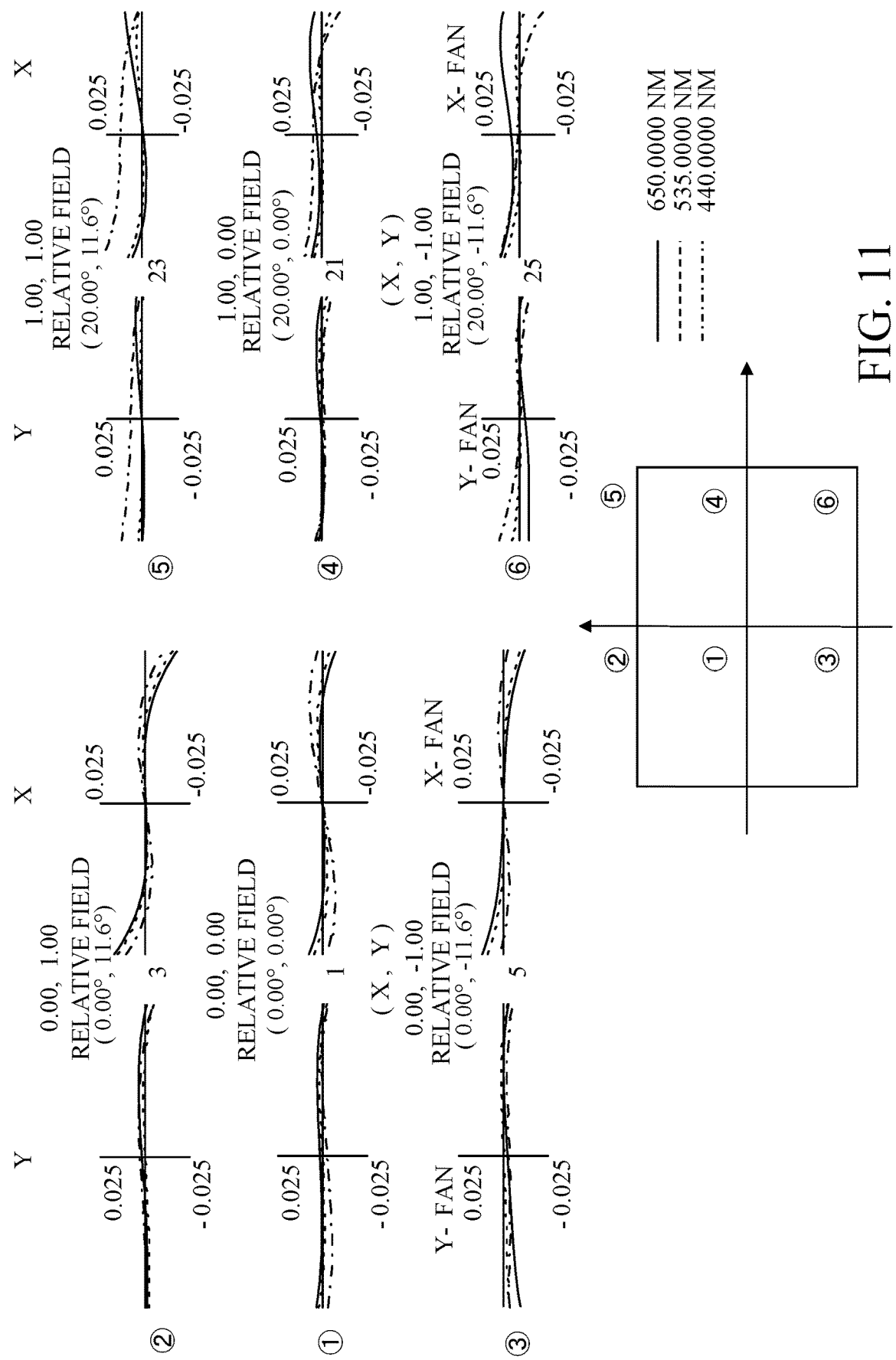
FIG. 11 illustrates lateral aberration diagrams of a projection optical system according to the numerical example 1.

A description will be given of the display apparatus (projection optical system) of the numerical example 1 with reference to FIGS. 6 and 11. FIG. 6 illustrates a sectional view of the display apparatus of this numerical example. FIG. 6 illustrates the same display apparatus (projection optical system) as that in FIG. 1. FIG. 11 provides lateral aberration diagrams of the projection optical system of this numerical example. In this numerical example, a horizontal angle of view (direction orthogonal to the plane of the figure) is ±20 degrees, the vertical angle of view (the direction in the plane of the figure) is ±11.57 degrees, and a pupil diameter is 7 mm. Table 1 indicates the position of the local origin of each surface. Table 2 indicates the coefficients of the rotationally asymmetric surfaces. Table 3 indicates the values of various conditions.

TABLE 1

| TYPE | SUR. NAME | SUR. NO. | Yg | Zg | θ g | Rx | Ry | D | N | V |
|---|---|---|---|---|---|---|---|---|---|---|
| SPH |  | 601 |  |  |  | 0.000 | 0.000 | Inf |  |  |
| SPH |  | 602 |  |  |  | 0.000 | 0.000 | 5.000 | 1.5163 | 64.14 |
| SPH | PUPIL (104) | 603 |  |  |  | 0.000 | 0.000 | 0.000 | 1.5163 | 64.14 |
| SPH |  | 604 |  |  |  | 0.000 | 0.000 | 15.000 | 1.5163 | 64.14 |
| SPH | GLOBAL ORIGIN | 605 |  |  |  | 0.000 | 0.000 | 0.000 |  |  |
| XYP | 103b | 606 | 6.118 | 1.146 | 1.888 | 0.000 | 0.000 | 0.000 | 1.5709 | 33.80 |
| XYP-M | 103c | 607 | 0.524 | 6.622 | −22.805 | 0.000 | 0.000 | 0.000 | 1.5709 | 33.80 |
| XYP-M | 103b | 608 | 6.118 | 1.146 | 1.888 | 0.000 | 0.000 | 0.000 | 1.5709 | 33.80 |
| XYP | 103a | 609 | 9.830 | 4.634 | 51.096 | 0.000 | 0.000 | 0.000 |  |  |
| SPH | 102-3 | 610 | 10.421 | 4.698 | 37.001 | 12.177 | 12.177 | 0.800 | 1.9591 | 17.47 |
| SPH | 102-2 | 611 |  |  |  | 7.646 | 7.646 | 4.500 | 1.5378 | 74.70 |
| SPH | 102-1 | 612 |  |  |  | −50.783 | −50.783 | 0.000 |  |  |
| SPH | Cover-1 | 613 | 14.695 | 10.370 | 38.160 | 0.000 | 0.000 | 1.100 | 1.5163 | 64.14 |
| SPH | Cover-2 | 614 |  |  |  | 0.000 | 0.000 | 0.070 |  |  |
| SPH | IMG | 615 |  |  |  | 0.000 | 0.000 | 0.000 |  |  |

TABLE 2

| 103b | | 103c | | 103a | |
|---|---|---|---|---|---|
| C2 | 0.0000E+00 | C2 | 0.0000E+00 | C2 | 0.0000E+00 |
| C3 | 0.0000E+00 | C3 | −1.9990E−02 | C3 | −2.0725E−03 |
| C4 | −9.2225E−03 | C4 | −1.4551E−02 | C4 | −3.4638E−03 |
| C5 | 0.0000E+00 | C5 | 0.0000E+00 | C5 | 0.0000E+00 |
| C6 | 8.9899E−04 | C6 | −7.7263E−03 | C6 | 3.1338E−03 |
| C7 | 0.0000E+00 | C7 | 0.0000E+00 | C7 | 0.0000E+00 |
| C8 | −6.9390E−04 | C8 | −2.9226E−04 | C8 | −6.4129E−05 |
| C9 | 0.0000E+00 | C9 | 0.0000E+00 | C9 | 0.0000E+00 |
| C10 | −1.9203E−04 | C10 | −2.5426E−04 | C10 | −6.4616E−05 |
| C11 | 4.7010E−06 | C11 | −1.3834E−06 | C11 | −5.4613E−06 |
| C12 | 0.0000E+00 | C12 | 0.0000E+00 | C12 | 0.0000E+00 |
| C13 | −1.8375E−05 | C13 | 8.4002E−06 | C13 | −7.1374E−05 |
| C14 | 0.0000E+00 | C14 | 0.0000E+00 | C14 | 0.0000E+00 |
| C15 | −1.9133E−06 | C15 | 1.0529E−05 | C15 | 2.8469E−06 |
| C16 | 0.0000E+00 | C16 | 0.0000E+00 | | |
| C17 | −2.4946E−07 | C17 | −5.5627E−07 | | |
| C18 | 0.0000E+00 | C18 | 0.0000E+00 | | |
| C19 | −1.4793E−06 | C19 | −1.6736E−06 | | |
| C20 | 0.0000E+00 | C20 | 0.0000E+00 | | |
| C21 | −3.4225E−07 | C21 | −1.0102E−06 | | |
| C22 | −1.5892E−08 | C22 | 3.6681E−10 | | |
| C23 | 0.0000E+00 | C23 | 0.0000E+00 | | |
| C24 | −7.5676E−08 | C24 | 1.7601E−08 | | |
| C25 | 0.0000E+00 | C25 | 0.0000E+00 | | |
| C26 | −2.9340E−08 | C26 | 1.3986E−07 | | |
| C27 | 0.0000E+00 | C27 | 0.0000E+00 | | |
| C28 | 4.7240E−09 | C28 | 7.9322E−08 | | |
| | | C29 | 0.0000E+00 | | |
| | | C30 | 4.4798E−10 | | |
| | | C31 | 0.0000E+00 | | |
| | | C32 | 2.6220E−09 | | |
| | | C33 | 0.0000E+00 | | |
| | | C34 | −2.0845E−00 | | |
| | | C35 | 0.0000E+00 | | |
| | | C36 | −4.1407E−09 | | |
| | | C37 | 1.0834E−11 | | |
| | | C38 | 0.0000E+00 | | |
| | | C39 | −1.2753E−10 | | |
| | | C40 | 0.0000E+00 | | |

TABLE 2-continued

| | 103b | 103c | 103a |
|---|---|---|---|
| C41 | | −6.8928E−10 | |
| C42 | | 0.0000E+00 | |
| C43 | | −4.3502E−10 | |
| C44 | | 0.0000E+00 | |
| C45 | | 1.0147E−10 | |

TABLE 3

| LENS UNIT 102 | | Σ (φ/v) |
|---|---|---|
| | | −0.00142 |
| | | TH/fL |
| | | 0.183 |
| FREE-FORMED SURFACE PRISM 103 | | φ |
| | 103a | 0.00557 |
| | 103b | 0.00567 |
| | | Rx/Ry |
| | 103c | 1.74 |
| PROJECTION OPTICAL SYSTEM 106 | | α |
| | | 5.744 |
| | | φL/φP |
| | | 0.48 |

Numerical Example 2

Figure 7:
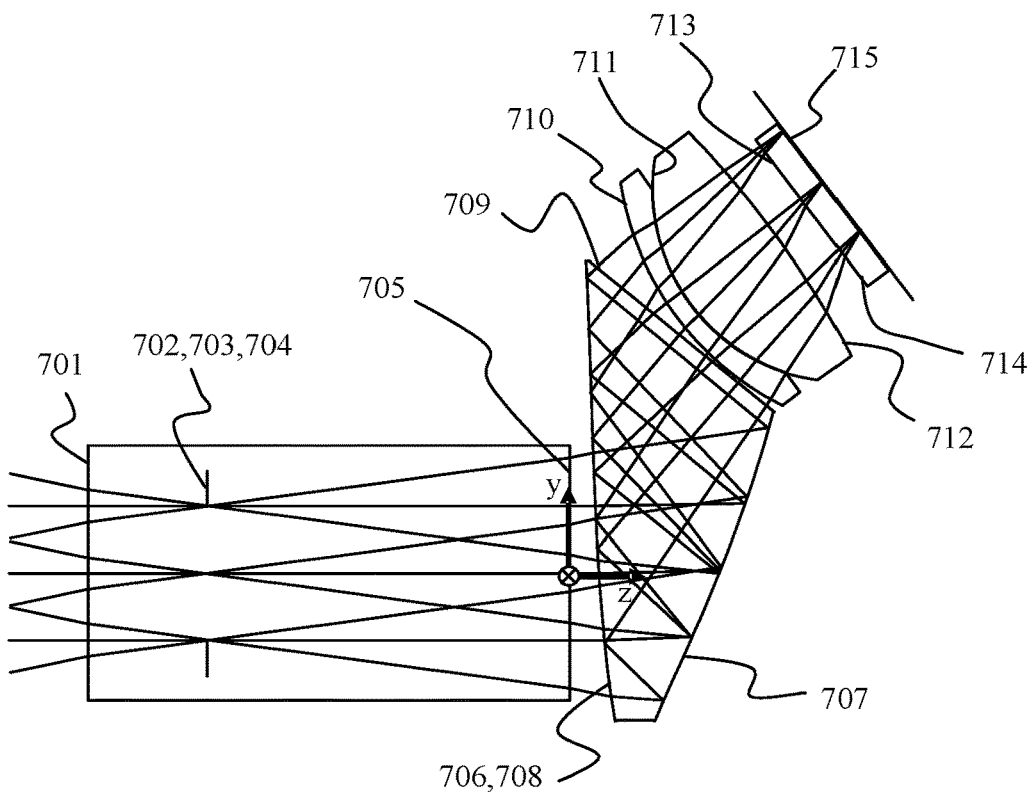
FIG. 7 illustrates a sectional view of a display apparatus according to a numerical example 2.
Figure 12:
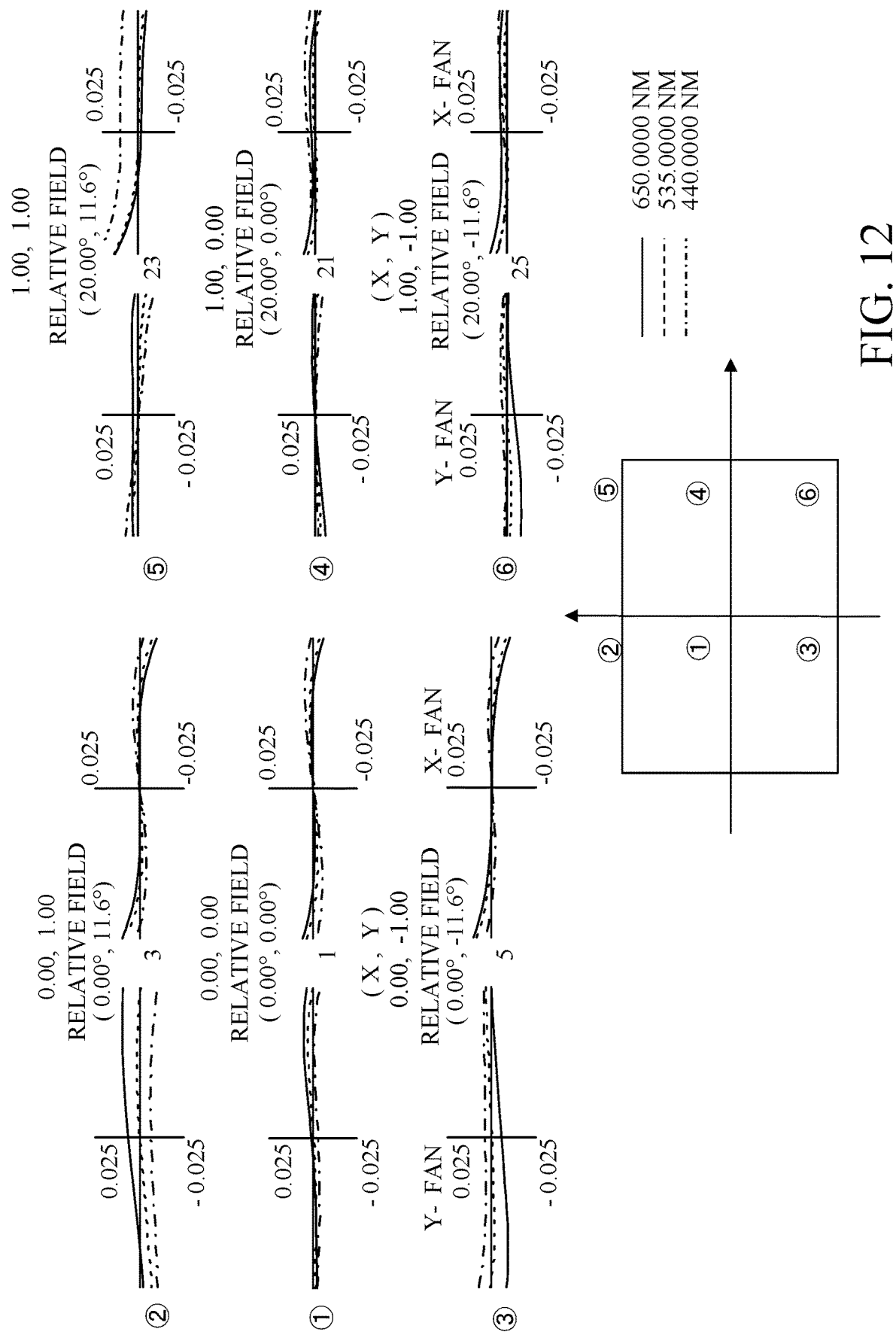
FIG. 12 illustrates lateral aberration diagrams of a projection optical system according to the numerical example 2.

A description will be given of the display apparatus (projection optical system) of the numerical example 2 with reference to FIGS. 7 and 12. FIG. 7 illustrates a sectional view of the display apparatus of this numerical example. FIG. 7 illustrates the same display apparatus (projection optical system) as that in FIG. 4. FIG. 12 provides lateral aberration diagrams of the projection optical system of this numerical example. In this numerical example, the horizontal angle of view (the direction orthogonal to the plane of the figure) is ±20 degrees, the vertical angle of view (the direction in the plane of the figure) is ±11.57 degrees, and the pupil diameter is 7 mm. Table 4 indicates the position of the local origin of each surface. Table 5 indicates the coefficients of the rotationally asymmetric surfaces. Table 6 indicates the values of various conditions.

TABLE 5

| | 203b | | 203c |
|---|---|---|---|
| C2 | 0.0000E+00 | C2 | 0.0000E+00 |
| C3 | 0.0000E+00 | C3 | −1.7782E−02 |
| C4 | −9.1930E−03 | C4 | −1.4601E−02 |
| C5 | 0.0000E+00 | C5 | 0.0000E+00 |
| C6 | 8.3896E−04 | C6 | −7.6417E−03 |
| C7 | 0.0000E+00 | C7 | 0.0000E+00 |
| C8 | −7.0526E−04 | C8 | −3.1290E−04 |
| C9 | 0.0000E+00 | C9 | 0.0000E+00 |
| C10 | −1.9067E−04 | C10 | −2.5488E−04 |
| C11 | 4.3411E−06 | C11 | −1.5750E−06 |
| C12 | 0.0000E+00 | C12 | 0.0000E+00 |
| C13 | −1.6402E−05 | C13 | 9.5669E−06 |
| C14 | 0.0000E+00 | C14 | 0.0000E+00 |
| C15 | −2.0920E−06 | C15 | 1.0624E−05 |
| C16 | 0.0000E+00 | C16 | 0.0000E+00 |
| C17 | −2.0435E−07 | C17 | −5.7378E−07 |
| C18 | 0.0000E+00 | C18 | 0.0000E+00 |
| C19 | −1.5805E−06 | C19 | −1.8903E−06 |
| C20 | 0.0000E+00 | C20 | 0.0000E+00 |
| C21 | −3.3668E−07 | C21 | −1.0552E−06 |
| C22 | −2.6253E−08 | C22 | −5.3641E−09 |
| C23 | 0.0000E+00 | C23 | 0.0000E+00 |
| C24 | −5.2862E−08 | C24 | 2.2991E−08 |
| C25 | 0.0000E+00 | C25 | 0.0000E+00 |
| C26 | −7.6928E−09 | C26 | 1.9939E−07 |
| C27 | 0.0000E+00 | C27 | 0.0000E+00 |
| C28 | 2.8106E−09 | C28 | 8.7638E−08 |
| | | C29 | 0.0000E+00 |
| | | C30 | 7.0611E−10 |
| | | C31 | 0.0000E+00 |
| | | C32 | −2.4029E−09 |
| | | C33 | 0.0000E+00 |
| | | C34 | −6.5849E−09 |
| | | C35 | 0.0000E+00 |
| | | C36 | −3.2051E−09 |
| | | C37 | 9.7871E−12 |
| | | C38 | 0.0000E+00 |
| | | C39 | −1.5655E−11 |
| | | C40 | 0.0000E+00 |
| | | C41 | −2.6384E−10 |
| | | C42 | 0.0000E+00 |
| | | C43 | −5.3277E−10 |
| | | C44 | 0.0000E+00 |
| | | C45 | −2.8537E−11 |

TABLE 4

| TYPE | SUR. NAME | SUR. NO. | Yg | Zg | θ g | Rx | Ry | D | N | V |
|---|---|---|---|---|---|---|---|---|---|---|
| SPH | | 701 | | | | 0.000 | 0.000 | Inf | | |
| SPH | | 702 | | | | 0.000 | 0.000 | 5.000 | 1.5163 | 64.14 |
| SPH | PUPIL (104) | 703 | | | | 0.000 | 0.000 | 0.000 | 1.5163 | 64.14 |
| SPH | | 704 | | | | 0.000 | 0.000 | 15.000 | 1.5163 | 64.14 |
| SPH | GLOBAL ORIGIN | 705 | | | | 0.000 | 0.000 | 0.000 | | |
| XYP | 203b | 706 | 6.120 | 0.911 | 1.887 | 0.000 | 0.000 | 0.000 | 1.5709 | 33.80 |
| XYP-M | 203c | 707 | 0.523 | 6.391 | −22.805 | 0.000 | 0.000 | 0.000 | 1.5709 | 33.80 |
| XYP-M | 203b | 708 | 6.120 | 0.911 | 1.887 | 0.000 | 0.000 | 0.000 | 1.5709 | 33.80 |
| SPH | 203a | 709 | 10.025 | 4.261 | 50.737 | 0.000 | 0.000 | 0.000 | | |
| SPH | 202-3 | 710 | 10.633 | 4.334 | 36.268 | 12.324 | 12.324 | 0.800 | 1.9591 | 17.47 |
| SPH | 202-2 | 711 | | | | 7.939 | 7.939 | 4.500 | 1.5378 | 74.70 |
| SPH | 202-1 | 712 | | | | −40.198 | −40.198 | 0.000 | | |
| SPH | Cover-1 | 713 | 14.805 | 10.020 | 37.426 | 0.000 | 0.000 | 1.100 | 1.5163 | 64.14 |
| SPH | Cover-2 | 714 | | | | 0.000 | 0.000 | 0.070 | | |
| SPH | IMG | 715 | | | | 0.000 | 0.000 | 0.000 | | |

TABLE 6

| LENS UNIT 202 | | Σ (φ/v) |
|---|---|---|
| | | −0.00122 |
| | | TH/fL |
| | | 0.201 |
| FREE-FORMED SURFACE PRISM 203 | | φ |
| | 203a | 0.00000 |
| | 203b | 0.00536 |
| | | Rx/Ry |
| | 203c | 1.59 |
| PROJECTION OPTICAL SYSTEM 201 | | α |
| | | 7.717 |
| | | φL/φP |
| | | 0.53 |

Numerical Example 3

Figure 8:
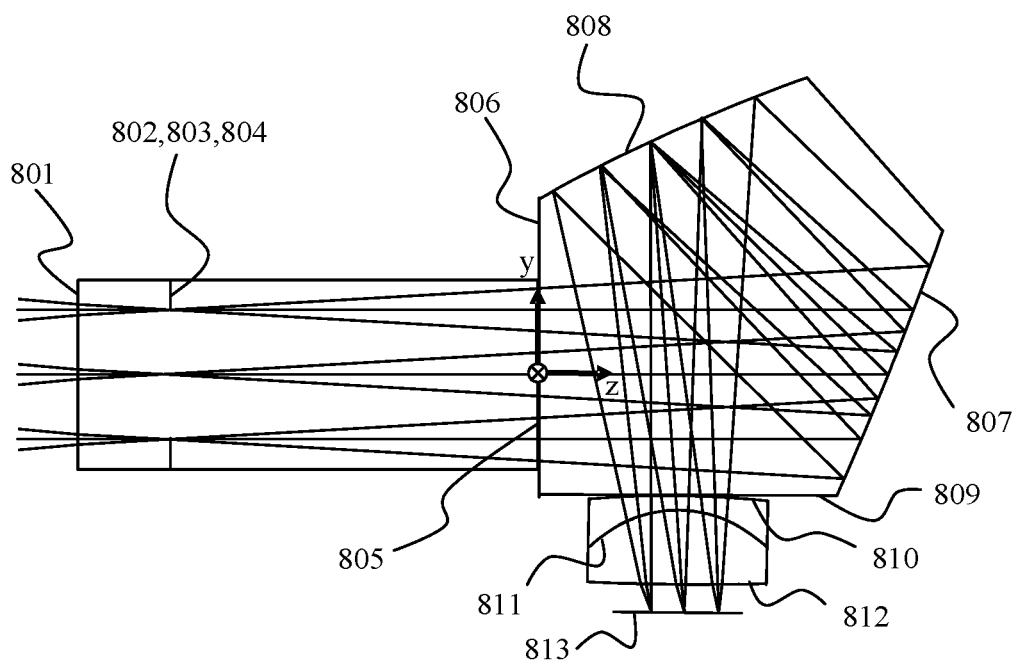
FIG. 8 illustrates a sectional view of a display apparatus according to a numerical example 3.
Figure 13:
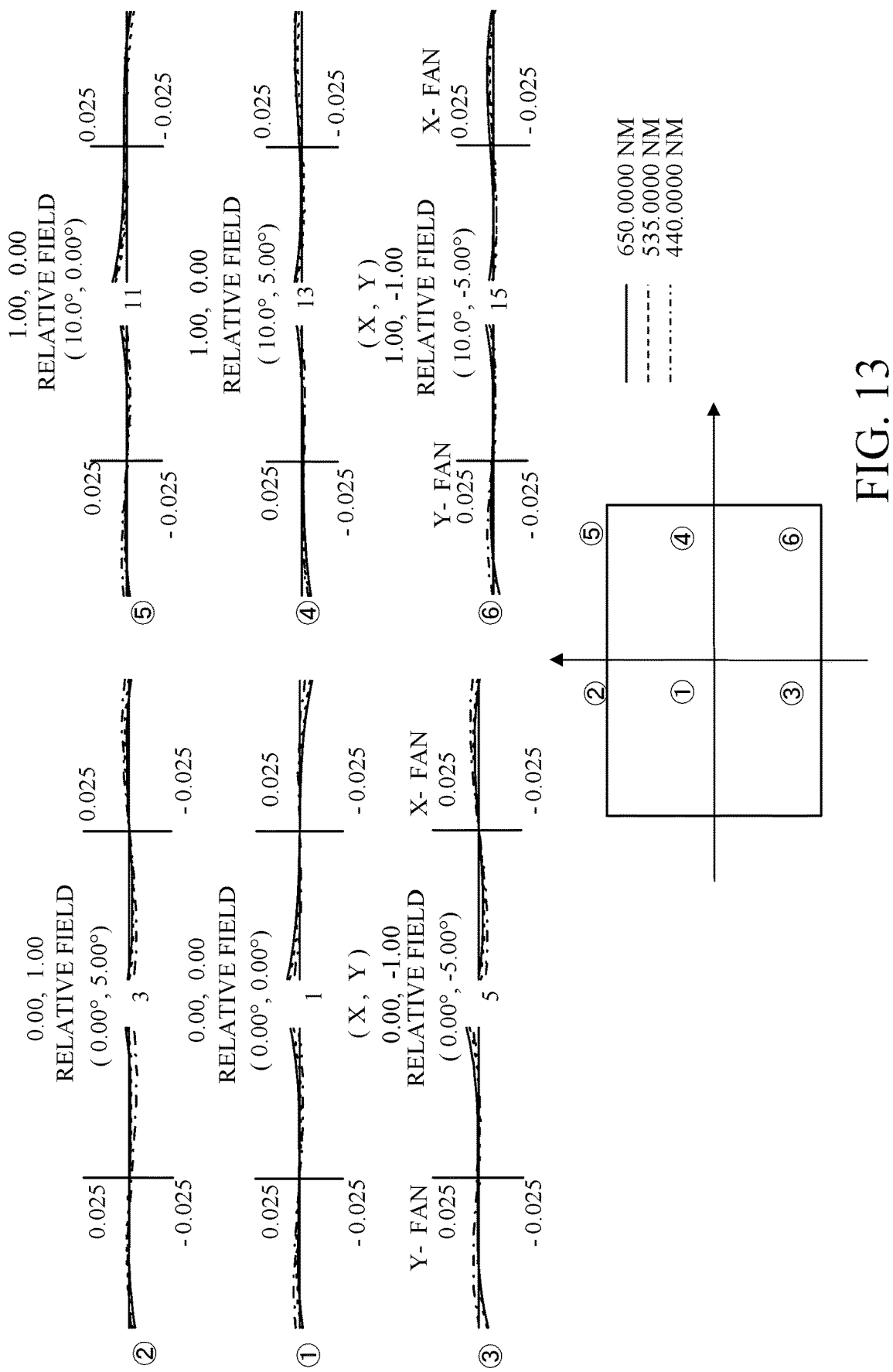
FIG. 13 illustrates lateral aberration diagrams of a projection optical system according to the numerical example 3.

A description will be given of the display apparatus (projection optical system) of the numerical example 3 with reference to FIGS. 8 and 13. FIG. 8 illustrates a sectional view of the display apparatus of this numerical example. FIG. 8 illustrates the same display apparatus (projection optical system) as that in FIG. 5. FIG. 13 provides lateral aberration diagrams of the projection optical system of this numerical example. In this numerical example, the horizontal angle of view (the direction orthogonal to the plane of the figure) is ±10 degrees, the vertical angle of view (the direction in the plane of the figure) is ±5 degrees, and the pupil diameter is 7 mm. Table 7 indicates the position of the local origin of each surface. Table 8 indicates the coefficients of the rotationally asymmetric surfaces. Table 9 indicates the values of various conditions.

TABLE 7

| TYPE | SUR. NAME | SUR. NO. | Yg | Zg | θ g | Rx | Ry | D | N | V |
|---|---|---|---|---|---|---|---|---|---|---|
| SPH | | 801 | | | | 0.000 | 0.000 | Inf | | |
| SPH | | 802 | | | | 0.000 | 0.000 | 5.000 | 1.5163 | 64.14 |
| SPH | PUPIL (104) | 803 | | | | 0.000 | 0.000 | 10.000 | 1.5163 | 64.14 |
| SPH | | 804 | | | | 0.000 | 0.000 | 0.100 | 1.5163 | 64.14 |
| SPH | GLOBAL ORIGIN | 805 | | | | 0.000 | 0.000 | 0.000 | | |
| SPH | 501d | 806 | 0.000 | 0.000 | 0.000 | 0.000 | 0.000 | 0.000 | 1.5709 | 33.80 |
| XYP-M | 501c | 807 | −21.124 | 8.929 | −25.503 | −200.000 | −200.000 | 0.000 | 1.5709 | 33.80 |
| XYP-M | 501b | 808 | 5.794 | −5.756 | −59.900 | 180.000 | 180.000 | 0.000 | 1.5709 | 33.80 |
| SPH | 501a | 809 | −6.471 | 4.575 | 89.746 | 0.000 | 0.000 | 0.000 | | |
| SPH | 102-3 | 810 | −6.522 | 7.538 | 89.623 | −66.880 | −66.880 | −0.800 | 1.6889 | 31.07 |
| SPH | 102-2 | 811 | | | | −6.715 | −6.715 | −4.000 | 1.6385 | 55.38 |
| SPH | 102-1 | 812 | | | | 185.556 | 185.556 | −1.500 | | |
| SPH | IMG | 813 | | | | 0.000 | 0.000 | 0.000 | | |

TABLE 8

| | 503b | | 503c |
|---|---|---|---|
| C2 | 0.0000E+00 | C2 | 0.0000E+00 |
| C3 | −8.9552E−02 | C3 | 4.2816E−02 |
| C4 | 2.4888E−03 | C4 | −1.7788E−03 |
| C5 | 0.0000E+00 | C5 | 0.0000E+00 |
| C6 | 4.8828E−03 | C6 | 3.0153E−04 |
| C7 | 0.0000E+00 | C7 | 0.0000E+00 |
| C8 | −5.3739E−06 | C8 | 4.2945E−05 |
| C9 | 0.0000E+00 | C9 | 0.0000E+00 |
| C10 | −4.6885E−05 | C10 | −6.2284E−07 |
| C11 | −1.4148E−06 | C11 | −7.8482E−07 |
| C12 | 0.0000E+00 | C12 | 0.0000E+00 |
| C13 | −2.2910E−06 | C13 | −1.4291E−06 |
| C14 | 0.0000E+00 | C14 | 0.0000E+00 |
| C15 | 1.0673E−07 | C15 | −4.4430E−08 |

TABLE 9

| LENS UNIT 502 | | Σ (φ/v) |
|---|---|---|
| | | −0.00116 |
| | | TH/fL |
| | | 0.00269 |
| FREE-FORMED SURFACE PRISM 501 | | φ |
| | 501a | 0.00000 |
| | 501b | 0.00000 |
| PROJECTION OPTICAL SYSTEM 503 | | α |
| | | 2.216 |

Each embodiment relates to the display apparatus that causes the light beam emitted by the projection optical system to enter the light guiding element, transmits the light inside the light guiding element, and displays the image to the observer. For example, it is suitably used for a small projector and a display apparatus such as a head-mounted display, a head-up display, a mobile phone, a 3D display, smart glasses and the like. Each embodiment can provide the projection optical system and the display apparatus each of which can correct the chromatic aberration and form the high-quality image while sufficiently ensuring the distance between the display element and the optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138510, filed on Jul. 29, 2019 which is hereby incorporated by reference herein in its entirety.

What is claimed is:

1. An optical system that guides a light beam from a display element, the optical system comprising:
   a plurality of lenses; and
   an optical element,
   wherein the optical element includes an entrance surface which the light beam from the plurality of lenses enters, a reflection surface configured to reflect the light beam, and an emission surface from which the light beam is emitted toward an exit pupil,
   wherein the light beam from the display element enters the optical element via the plurality of lenses, is reflected a plurality of times inside the optical element, and heads for the exit pupil, and wherein a following conditional expression is satisfied:

$$-0.01 < \sum_{m=1}^{n} \frac{\phi_m}{v_m} < 0.01 \ [1/\text{mm}]$$

where m (m=1 . . . n) represents an order of the plurality of lenses counted from a display element side, $\varphi_m$ represents an optical power of an m-th lens, and $v_m$ represents an Abbe number of the m-th lens, and
wherein a following conditional expression is satisfied:
$0.1<|\varphi_L/\varphi_P|<0.8$
where $\varphi_L$ represents a combined optical power of the plurality of lenses, and $\varphi_P$ represents an optical power of an entire optical system.

2. The optical system according to claim 1,
wherein a following conditional expression is satisfied:
|TH/fl|<0.5 where TH represents a distance between, among the plurality of lenses, a surface vertex of a surface closest to the display element and a surface vertex of a surface farthest from the display element, and fl represents a combined focal length of the plurality of lenses.

3. The optical system according to claim 1,
wherein a following conditional expression is satisfied:
0 [degree]<α<10[degree] where α represents a maximum value of angles each of which is formed by a principal ray at a central angle of view and another principal ray incident on the exit pupil.

4. The optical system according to claim 1,
wherein the plurality of lenses includes a positive lens and a negative lens which are cemented to each other.

5. The optical system according to claim 4,
wherein at least one of the positive lens and the negative lens is a meniscus lens.

6. The optical system according to claim 1,
wherein following conditional expressions are satisfied:
−0.01[1/mm]<$\varphi_i$<0.01[1/mm]
−0.01[1/mm]<$\varphi_o$<0.01[1/mm] where, at an intersection in a section including an optical axis with a principal ray incident on a central angle of view of the exit pupil, $\varphi_i$ represents an optical power of the entrance surface and $\varphi_o$ represents an optical power of the emission surface.

7. The optical system according to claim 6,
wherein the reflection surface is axisymmetric about a symmetry axis,
wherein a first section is a plane including a center of the exit pupil and the symmetry axis, and a second section is a plane orthogonal to the first section and including the principal ray, and
wherein a following expression is satisfied:
1<Ry/Rx<5 where at a farthest intersection in the first section from the exit pupil among intersections of the reflection surface and the principal ray incident on the exit pupil, Ry represents a radius curvature of the reflection surface in the first section, and Rx represents a radius curvature of the reflection surface in the second section.

8. The optical system according to claim 7,
wherein the plurality of lenses has a positive optical power as a whole.

9. The optical system according to claim 8,
wherein among the plurality of lenses, a lens closest to the display element has the positive optical power.

10. A display apparatus comprising:
a display element; and
the optical system according to claim 1.

11. The display apparatus according to claim 10, further comprising a light guiding element configured to guide a light beam from the optical system.

* * * * *